United States Patent
Cho et al.

(10) Patent No.: US 10,479,017 B2
(45) Date of Patent: Nov. 19, 2019

(54) SEQUENTIAL JOINT BEHAVIOR SHEET USING PHOTO DEFORMATION AND METHOD OF CONTROLLING FOLDING AND UNFOLDING THEREOF

(71) Applicant: Seoul National University R&DB Foundation, Seoul (KR)

(72) Inventors: Maenghyo Cho, Seoul (KR); Yonghee Lee, Seoul (KR); Taesoon Hwang, Seoul (KR); Jong Gu Lee, Seoul (KR); Junghyun Ryu, Seoul (KR); Hyeok Lee, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 691 days.

(21) Appl. No.: 14/805,990

(22) Filed: Jul. 22, 2015

(65) Prior Publication Data
US 2016/0311151 A1  Oct. 27, 2016

(30) Foreign Application Priority Data
Apr. 24, 2015 (KR) .......................... 10-2015-0058139

(51) Int. Cl.
*B29C 61/00* (2006.01)
*B29K 25/00* (2006.01)

(52) U.S. Cl.
CPC ........ *B29C 61/003* (2013.01); *B29K 2025/06* (2013.01); *B29K 2995/0018* (2013.01)

(58) Field of Classification Search
None
See application file for complete search history.

(56) References Cited

U.S. PATENT DOCUMENTS
2013/0045530 A1    2/2013  Gracias et al.

FOREIGN PATENT DOCUMENTS
WO        2007001407 A2     1/2007

OTHER PUBLICATIONS

Liu et al. ( "Self-folding of polymer sheets using local light absorption", Soft Matter, vol. 8, No. 6, Feb. 14, 2012, pp. 1703-2044 <http://pubs.rsc.org/en/content/articlepdf/2012/sm/c1sm06564e>) (Year: 2012).*

(Continued)

*Primary Examiner* — Laura C Powers
(74) *Attorney, Agent, or Firm* — Osha Liang LLP

(57) ABSTRACT

Provided are a sequential joint behavior sheet using photo deformation and a method of controlling folding and unfolding thereof. The sequential joint behavior sheet includes at least three rigid parts, a first joint part joining two of the rigid parts that are adjacent to each other, and a second joint part joining two of the rigid parts that are adjacent to each other and spaced apart from the first joint part. Here, the first and second joint parts have a first state in which the same rigid state as the rigid parts is maintained, and a second state in which one rigid part performs a folding behavior with respect to the other rigid part of the two adjacent rigid parts between the first and second joint parts, the second state being reached when light is absorbed, and print patterns having different degrees of transparency are formed on a transparent high-molecular-weight polymer in the first and second joint parts, and thus a folding behavior is sequentially performed at the first and second joint parts due to different times taken to reach the second state through radiation of light according to degrees of transparency of the first and second joint parts.

8 Claims, 4 Drawing Sheets

(56) References Cited

OTHER PUBLICATIONS

Office Action issued in Korean Application No. 2016-043801773; dated Jun. 17, 2016 (13 pages).
ReSEAT Analysis Report, Jun. 22, 2007, 8-9 (10 pages).
Lee, Yonghee et al., "The Research on the deformation from flat polystyrene sheet to 3D shape by light" School of Mechanical and Aerospace Engineering, Seoul Nat'l Univ., Apr. 16, 2015 (3 pages).
Lee, Yonghee et al., "The study on the complex behavior using photo-deformation of the polystyrene sheet" Nov. 13, 2014 (5 pages).

* cited by examiner

[FIG. 1]
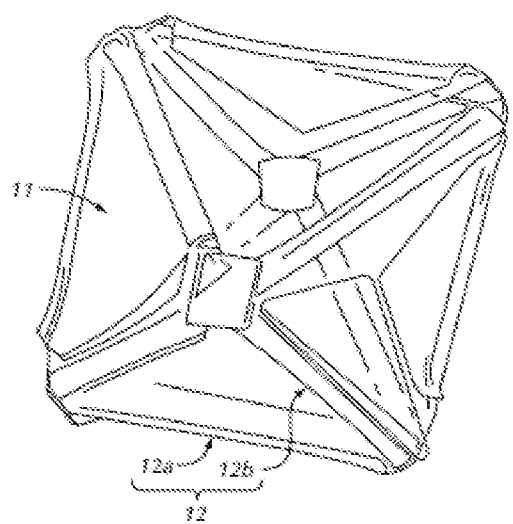
[FIG. 2]
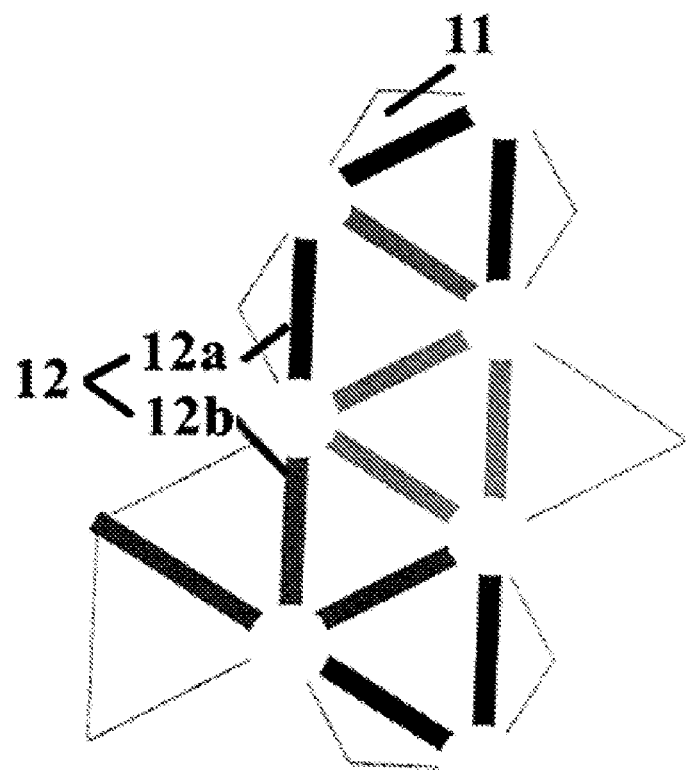

[FIG. 3]
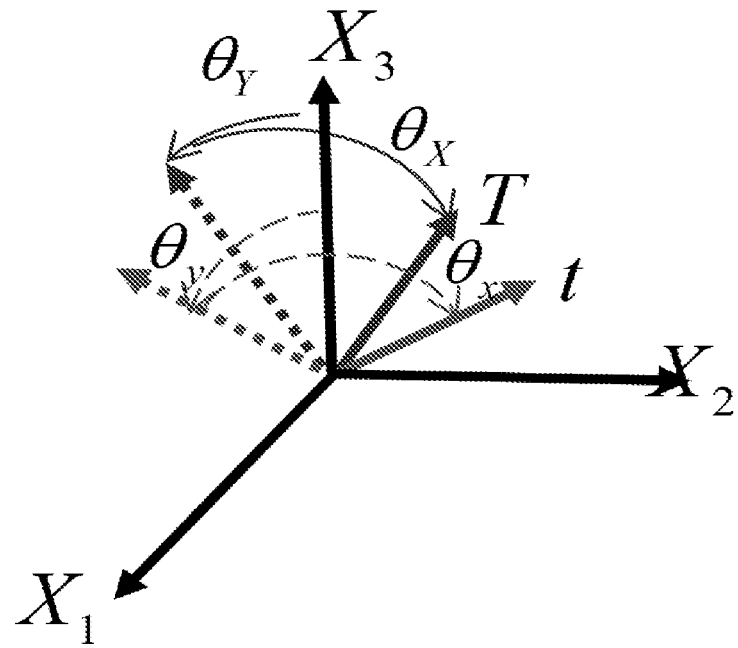
[FIG. 4]
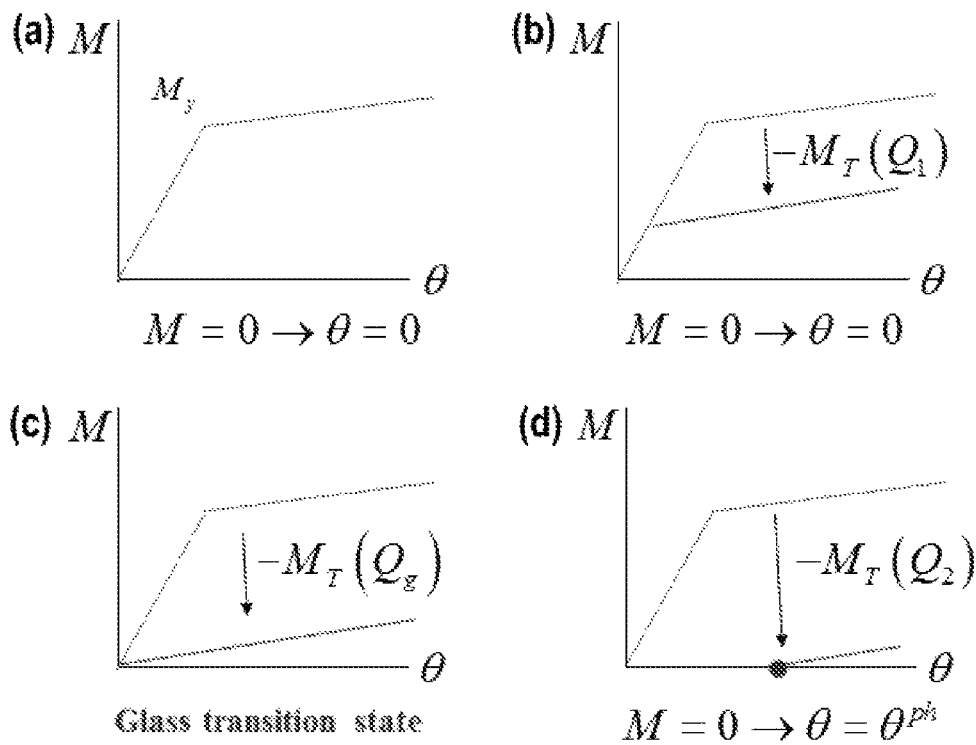

[FIG. 5]
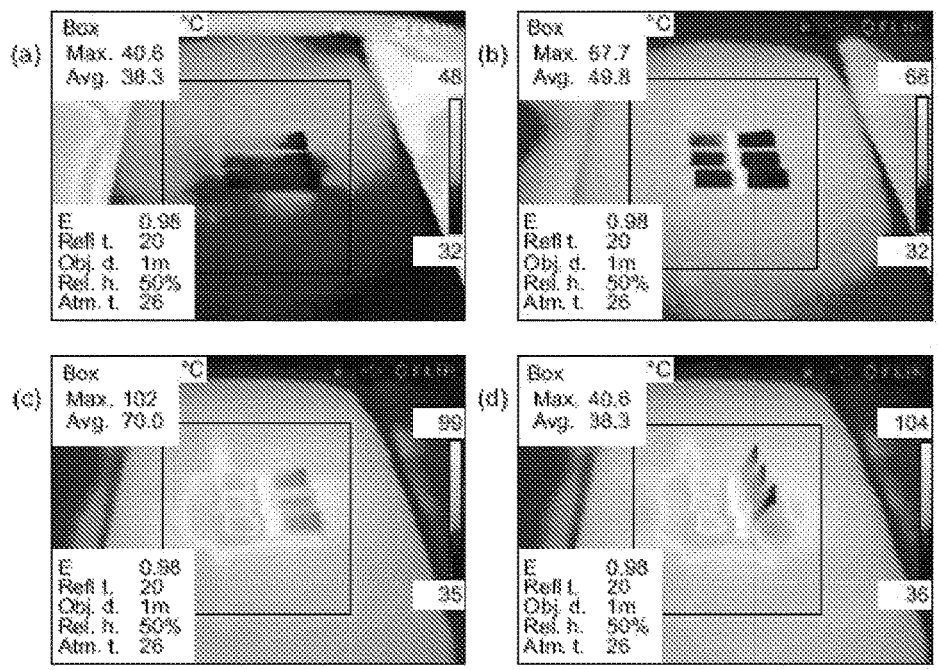
[FIG. 6]
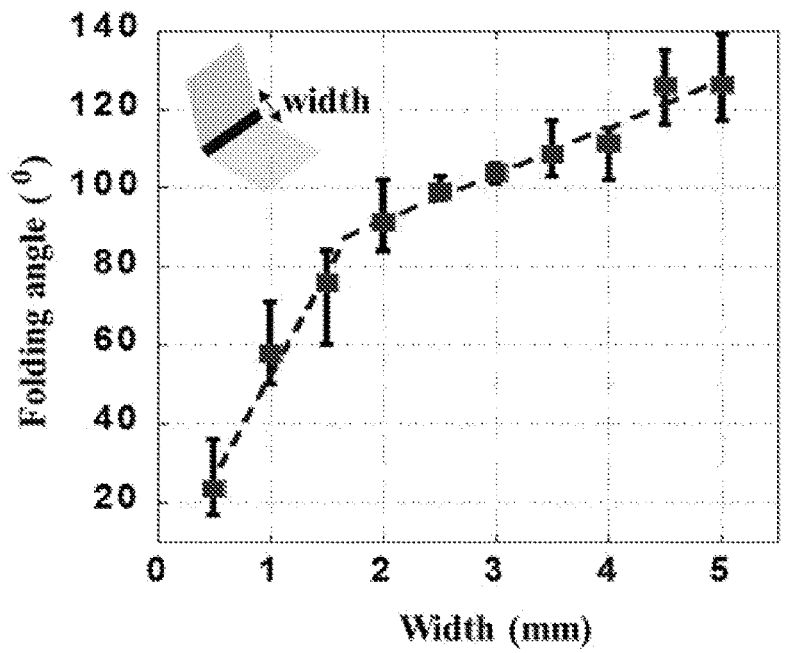

[FIG. 7]
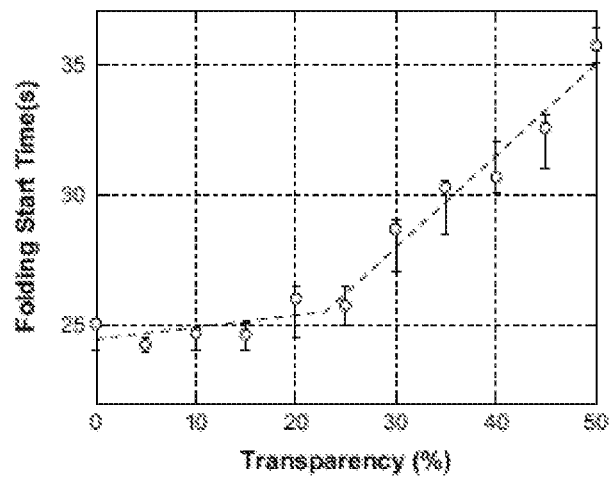

SEQUENTIAL JOINT BEHAVIOR SHEET USING PHOTO DEFORMATION AND METHOD OF CONTROLLING FOLDING AND UNFOLDING THEREOF

CROSS-REFERENCE TO RELATED APPLICATION

This application claims priority to and the benefit of Korean Patent Application No. 2015-0058139, filed on Apr. 24, 2015, the disclosure of which is incorporated herein by reference in its entirety.

BACKGROUND

1. Field of the Invention

The present invention relates to a sequential joint behavior sheet using photo deformation and a method of controlling folding and unfolding thereof, and more particularly, to a sequential joint behavior sheet using photo deformation capable of realizing a sequential automatic folding motion by light absorption and a method of controlling folding and unfolding thereof.

2. Discussion of Related Art

Smart materials that have been recently being developed have received great attention because a driving method of the materials can go beyond conventional limits. Particularly, a shape memory material is deformed into a previously imprinted shape when it approaches a specific temperature due to application of heat, and a Piezo material undergoes mechanical deformation when it is electrified. In such smart materials, deformation occurs without complicated assembly of parts.

Meanwhile, in the conventional self-folding sub-centimeter structure disclosed in U.S. Patent Application Publication No. 2013-0045530, a first structure and a second structure, which are joined by a joint medium, are self-folded by non-contact control through a change in temperature.

However, in the conventional art as described above, when a self-folding structure is composed of various complicated parts, the self-folding structure can perform an irregular folding motion, not a sequential folding motion, and therefore it has a problem in that the structures attach to each other and cannot carry out a normal folding behavior.

In addition, to realize a mechanical behavior of the structure, an energy source should be directly connected to a material, and thus it has been difficult to use the structure in some peripheral environments.

SUMMARY OF THE INVENTION

Therefore, the present invention is provided to solve the above-described problem, and directed to providing a sequential joint behavior sheet using photo deformation which can sequentially perform an automatic folding motion by non-contact control using photo-modification and a method of controlling folding and unfolding thereof.

In one aspect, a sequential joint behavior sheet using photo deformation according to the present invention includes at least three rigid parts; a first joint part joining two of the rigid parts that are adjacent to each other; a second joint part joining two of the rigid parts that are adjacent to each other and spaced apart from the first joint part. The first and second joint parts have a first state in which the same rigid state as the rigid part is maintained and a second state in which one rigid part performs a folding behavior with respect to the other rigid part of the two adjacent rigid parts between the first and second joint parts, the second state being reached when light is absorbed, and print patterns having different degrees of transparency are formed on a transparent high-molecular-weight polymer in the first and second joint parts, and thus a folding behavior is sequentially performed at the first and second joint parts due to different times taken to reach the second state through radiation of light according to the degrees of transparency of the first and second joint parts.

According to the present invention, a black color is proposed as the print pattern color.

According to the present invention, the first and second joint parts have different width of printed lines.

According to the present invention, the high-molecular-weight polymer includes a polystyrene sheet.

In addition, the sequential joint behavior sheet using photo deformation according to the present invention includes a transparent high-molecular-weight polymer sheet and at least two print patterns spaced apart from each other on the high-molecular-weight polymer sheet. The print patterns form joint parts of the polymer sheet at which adjacent regions are folded with respect to each other based on the print patterns, and the at least two print patterns are printed in ink to have different degrees of transparency on the high-molecular-weight polymer sheet.

According to the present invention, the high-molecular-weight polymer sheet includes a polystyrene sheet.

In another aspect, a method of controlling folding and unfolding of a sheet joint using photo deformation according to the present invention includes designing a high-molecular-weight polymer sheet enabling folding or unfolding of joint parts at which adjacent parts are folded with respect each other, forming a print pattern in each joint part, the print patterns being formed to have different degrees of transparency according to a behavior order, and performing photo deformation in which a sequential behavior occurs from a joint part having a low-transparency print pattern to a joint part having a high-transparency print pattern through radiation of light.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a perspective view of a product in which a complex behavior is realized and that is manufactured by photo deformation of a sequential joint behavior sheet according to the present invention;

FIG. 2 is a diagram of a sequential joint behavior sheet using photo deformation according to the present invention;

FIG. 3 is a diagram illustrating a folding behavior of a polystyrene sheet before and after deformation;

FIG. 4 is a graph of a strain-stress curve of the polystyrene sheet according to the present invention;

FIG. 5 is a diagram illustrating a thermal deformation state of the polystyrene sheet according to the present invention;

FIG. 6 is a graph showing a folding angle to a width of a print pattern of the polystyrene sheet according to the present invention; and FIG. 7 is a graph showing a folding angle and a folding reaction time to transparency of the polystyrene sheet according to the present invention.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Exemplary embodiments of the present invention will be described in detail below with reference to FIGS. 1 to 7.

As shown in FIG. 1, a sequential joint behavior sheet using photo deformation according to the present invention is formed of a transparent high-molecular-weight polymer that rapidly contracts approximately 50 to 60% when light is absorbed and a temperature of the sheet exceeds a glass transition temperature.

As shown in FIG. 1, such a sequential joint behavior sheet is folded in a polygonal box shape, and configured such that a width and a transparency of a print pattern, which correspond to a folding angle and a folding reaction time with radiation of light, are adjustable.

As shown in FIG. 2, the sequential joint behavior sheet according to the present invention includes at least three rigid parts 11 that form a certain shape of a surface and do not deform, a first joint part 12a joining two of the rigid parts 11 adjacent to each other, and a second joint part 12b joining two of the rigid parts 11 adjacent to each other and spaced apart from the first joint part 12a.

The first and second joint parts 12a and 12b have a first state in which they maintain the same rigid state as the rigid part 11, and a second state in which one rigid part 11 carries out a folding behavior to the other one 11 of the two rigid parts 11 adjacent to each other between the first and second joint parts 12a and 12b, and the first and second joint parts 12a and 12b reach the second state by absorbing light. That is, when approaching the second state by absorbing light, from a development state, the first and second joint parts 12a and 12b change to a folding state in which a folding behavior is performed, and from the folding state, they change to an unfolding state in which a developing behavior is performed.

In the first and second joint parts 12a and 12b, the print patterns having different width and different degrees of transparency are formed on a transparent high-molecular weight polymer.

Here, a line width of the print pattern 11 determines a degree of the folding behavior, and as the line width of the print pattern 11 is increased, the folding angle is increased. That is, through the adjustment of the line width of the print pattern, the folding angle of the joint part 12 may be set.

The print pattern may be formed in black in the joint part 12 to be folded, and thus formed with various concentrations of black ink. That is, each print pattern has the same color, and is printed in ink having a different transparency.

Therefore, according to the degrees of transparency of the first and second joint parts 12a and 12b in the radiation of light, a time to the second state is changed, and a folding behavior is sequentially performed at the first and second joint parts 12a and 12b.

As described above, in the first and second joint parts 12a and 12b at which the folding behavior of the high-molecular-weight polymer can be performed, a black print pattern 11 having a high light absorption rate is formed. The black print pattern 11 printed in the first and second joint parts 12a and 12b uses photo deformation, and thus when the black print pattern 11 is irradiated with light and intensively absorbs light, the folding behavior occurs. That is, when the high-molecular-weight polymer is irradiated with light and reaches the glass transition temperature, the folding behavior is performed along the black print pattern 11.

According to the present invention, a color of the print pattern 11 is set to black, but a different color may be selected. It is important to select a color having a high light absorption rate.

Since the folding behavior of the high-molecular-weight polymer uses a wavelength energy of light, a direct energy supplying means is unnecessary, and the light is environmentally-friendly energy and thus not harmful to a human body. According to the present invention, the high-molecular-weight polymer includes a polystyrene sheet 10.

The folding behavior of the polystyrene sheet 10 is determined by a shape of the print pattern 11 and the intensity of light, and according to an exemplary embodiment of the present invention, a complex sequential folding behavior can be realized through the design of the print pattern 11, as well as a simple folding behavior.

In an exemplary embodiment of the present invention, as shown in FIG. 2, as the intensity of the absorbed light is adjusted by adjusting the transparency of the print pattern 11 printed on the polystyrene sheet 10, a sequential folding behavior of the polystyrene sheet 10 can be performed.

Meanwhile, according to the method of controlling folding and unfolding of a joint of the polystyrene sheet 10 according to the present invention, a high-molecular-weight polymer sheet is designed to enable folding or unfolding of joint parts 12 adjacent to each other based on the joint part 12 of the polystyrene sheet 10 of which adjacent regions are folded, and then a print pattern is formed on each joint part 12 to have a different transparency according to a behavior order.

Subsequently, a sequential behavior is performed from the joint part 12 having a low-transparency print pattern to the joint part 12 having a high-transparency print pattern when the polystyrene sheet 10 is irradiated with light.

For example, such a sequential joint behavior sheet using photo deformation may be applied to a drug transfer system to transfer drugs into a human body, and may also be applied to a solar cell plate developed in outer space by being integrated into a satellite.

The polystyrene sheet 10 according to the present invention is not deformed before reaching a specific temperature, but dramatically contracts when the radiated light is absorbed and a temperature exceeds the specific temperature (glass transition temperature). Such a phenomenon is shown when a temperature exceeds the specific temperature even with no external force, as shown in FIG. 4 in which a plastic curve declines according to an increasing temperature.

Hereinafter, the present invention will be described in further detail with reference to an experimental example.

Experimental Example

To measure reactivity to light of a polystyrene sheet 10, an experiment was performed in the following order. A material sample having a size of 3 cm×1.5 cm was manufactured, and a folding angle and a folding reaction time were measured while adjusting a width and transparency of a print pattern 11, thereby obtaining a design variable.

Uniform light distribution was created using a dimmer in which tubular halogen lamps were aligned in parallel, and then the material sample was irradiated with light of approximately 86,000 lux at a temperature of approximately 40° C. to measure a degree of photo deformation.

Through the experiment for the photo deformation of the polystyrene sheet 10 according to light, a folding degree and a folding reaction time according to the print pattern 11 of the sheet 10 were measured.

As shown in FIG. 5, it can be noted that when the polystyrene sheet 10 was irradiated with light, the print pattern 11 in the joint part 12 intensively absorbed the light, and then when a temperature reached the glass transition temperature (approximately 102° C.), a folding behavior occurred. The changes in the folding angle and the photo deformation reaction time according to the print pattern 11 of the polystyrene sheet 10 can be analyzed by the graphs shown in FIGS. 6 and 7.

A width of the print pattern 11 formed on the polystyrene sheet 10 is the most critical factor to determine a degree of the folding behavior, and a relationship between the width of the print pattern 11 and the folding angle may be obtained. In addition, the control of transparency of the print pattern 11 to differentially absorb light by uniform light distribution is necessary for the realization of a sequential behavior of the polystyrene sheet 10. The folding reaction time and the folding angle according to the transparency of the print pattern 11 of the polystyrene sheet 10 were measured, and are shown in FIG. 7. As shown in FIG. 7, it can be noted that the transparency of the print pattern 11 of the polystyrene sheet 10 does not have a great influence on the folding angle, but is closely related to the folding reaction time of the polystyrene sheet 10.

A complex behavior of the polystyrene sheet 10 can be designed by the relational expression between the photo deformation of the polystyrene sheet 10 and the width and transparency of the print pattern 11 obtained through the above-described experiment. For example, a complex behavior forming a regular octahedron is realized through the design of the complex behavior of the polystyrene sheet 10. Here, a dihedral angle of the regular octahedron is approximately 109.47 degrees, and thus the print pattern 11 of the polystyrene sheet 10 is designed to correspond to a width of a printed line required for each folding angle, and transparency of the print pattern 11 is adjusted to sequentially perform photo deformation.

As shown in FIG. 1, it can be noted that the print pattern 11 has the highest transparency in the center of the polystyrene sheet 10. When an inside of the polystyrene sheet 10 is folded first, light cannot be radiated perpendicular to an outer surface of the polystyrene sheet 10 from a light source, and thus light absorption is not properly performed and a sequential folding behavior does not occur. For this reason, the transparency of the print pattern 11 is preferably adjusted to realize photo deformation first at the outside of the polystyrene sheet 10.

Accordingly, while conventional materials have to directly receive energy from an energy supplying means, the polystyrene sheet 10 according to the present invention absorbs energy from light to perform photo deformation, and thus a behavior can be controlled from far away and a sequential complex behavior can be realized by adjusting transparency.

According to a sequential joint behavior sheet using photo deformation and a method of controlling folding and unfolding thereof according to the present invention having the configuration described above, a complex behavior can be designed to obtain various shapes by sequentially performing an automatic folding motion through non-contact control using photo-modification.

Since photo deformation is caused by light, a folding behavior can be controlled from far away, and a separate energy supplying means is unnecessary.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A sequential joint sheet using photo deformation, comprising:
    at least three rigid parts that are of a rigid state;
    a first joint part joining two of the rigid parts that are adjacent to each other; and
    a second joint part joining two of the rigid parts that are adjacent to each other and spaced apart from the first joint part,
    wherein the first and second joint parts have a first state in which the adjacent rigid parts joined by the first and second joint parts are parallel to each other, and a second state in which a folding behavior occurs along the first and second joint parts wherein one rigid part performs a folding behavior with respect to the other rigid part of the two adjacent rigid parts between the first and second joint parts, the second state being reached when light is absorbed, and
    print patterns having different degrees of transparency are formed on a transparent high-molecular-weight polymer in the first and second joint parts, and thus a folding behavior is sequentially performed at the first and second joint parts due to different times taken to reach the second state through radiation of light according to the degrees of transparency of the first and second joint parts when the transparent high-molecular-weight polymer is exposed to uniform light distribution.

2. The sheet of claim 1, wherein a color of the print pattern is black.

3. The sheet of claim 1, wherein the first and second joint parts have different widths from each other.

4. The sheet of claim 1, wherein the high-molecular-weight polymer includes a polystyrene sheet.

5. A sequential joint behavior sheet using photo deformation, comprising:
    a transparent high-molecular-weight polymer sheet; and
    at least two print patterns spaced apart from each other on the high-molecular-weight polymer sheet,
    wherein the print patterns form joint parts of the polymer sheet at which adjacent regions are folded with respect to each other based on the print patterns, and
    the at least two print patterns are printed in ink to have different degrees of transparency on the high-molecular-weight polymer sheet wherein the at least two print patterns having different degrees of transparency sequentially preform a folding behavior depending on the degree of transparency when the transparent high-molecular-weight sheet is exposed to uniform light distribution.

6. The sheet of claim 5, wherein the high-molecular-weight polymer sheet includes a polystyrene sheet.

7. The sheet of claim 1, wherein the degree of transparency of the print pattern in each joint part comprises variations in the concentration of the ink used to form the print pattern.

8. The sheet of claim 5, wherein the degree of transparency of the print pattern in each joint part comprises variations in the concentration of the ink used to form the print pattern.

* * * * *